(12) United States Patent
Biester

(10) Patent No.: US 7,231,934 B2
(45) Date of Patent: Jun. 19, 2007

(54) SHUT-OFF ACTUATOR WITH GAS GENERATION DEVICE

(75) Inventor: Klaus Biester, Wienhausen (DE)

(73) Assignee: Cameron International Corporation, Houston, TX (US)

( * ) Notice: Subject to any disclaimer, the term of this patent is extended or adjusted under 35 U.S.C. 154(b) by 291 days.

(21) Appl. No.: 10/489,572

(22) PCT Filed: Sep. 18, 2002

(86) PCT No.: PCT/EP02/10470

§ 371 (c)(1),
(2), (4) Date: Aug. 23, 2004

(87) PCT Pub. No.: WO03/025338

PCT Pub. Date: Mar. 27, 2003

(65) Prior Publication Data

US 2005/0005966 A1    Jan. 13, 2005

(30) Foreign Application Priority Data

Sep. 20, 2001 (DE) .......................... 201 15 467 U

(51) Int. Cl.
*F16K 17/14* (2006.01)

(52) U.S. Cl. .................. 137/68.13; 137/456; 251/63.6; 251/329

(58) Field of Classification Search ............. 137/68.13; 251/63.5–63.6, 76, 297, 89, 326–329
See application file for complete search history.

(56) References Cited

U.S. PATENT DOCUMENTS

| 1,769,386 | A | * | 7/1930 | Orton | 251/326 |
|---|---|---|---|---|---|
| 2,780,389 | A | * | 2/1957 | Sandgren | 222/5 |
| 2,986,005 | A | | 5/1961 | Dudley | |
| 3,100,965 | A | | 8/1963 | Blackburn | |
| 3,684,008 | A | | 8/1972 | Garrett | |
| 3,766,979 | A | | 10/1973 | Petrick | |
| 3,780,753 | A | * | 12/1973 | Jablansky | 137/68.13 |
| 4,021,058 | A | * | 5/1977 | Suzuki et al. | 280/737 |
| 4,074,527 | A | | 2/1978 | Sadler | |
| 4,163,477 | A | | 8/1979 | Johnson et al. | |
| 4,213,480 | A | * | 7/1980 | Orum et al. | 137/556 |
| 4,281,819 | A | * | 8/1981 | Linder | 251/328 |
| 4,373,582 | A | | 2/1983 | Bednar et al. | |
| 4,408,627 | A | * | 10/1983 | Harris | 137/242 |
| 4,619,111 | A | | 10/1986 | Whiteman | |
| 4,711,262 | A | * | 12/1987 | Wafer et al. | 137/14 |

(Continued)

*Primary Examiner*—Eric Keasel
*Assistant Examiner*—Cloud Lee
(74) *Attorney, Agent, or Firm*—Conley Rose, P.C.

(57) ABSTRACT

A shut-off device, in particular for application in the extraction of natural gas and mineral oil, has a shut-off housing (3) comprising an admission channel (2) and in which a shut-off organ (4) is supported in an adjustable manner relative to the admission channel (2) between an open position (5) and a closed position (6), and has an actuating device (7) at least for adjusting the shut-off organ (4) from the open position (5) into the closed position (6). To improve such a shut-off device in that, especially in an emergency, fast adjustment of the shut-off organ to the closed position is possible in a constructively easy and economical manner, the actuating device comprises a gas generation device (8) for the production of an adjustment pressure for adjusting the shut-off organ (4) in the direction of the close position (6).

23 Claims, 2 Drawing Sheets

U.S. PATENT DOCUMENTS

Figure 1:
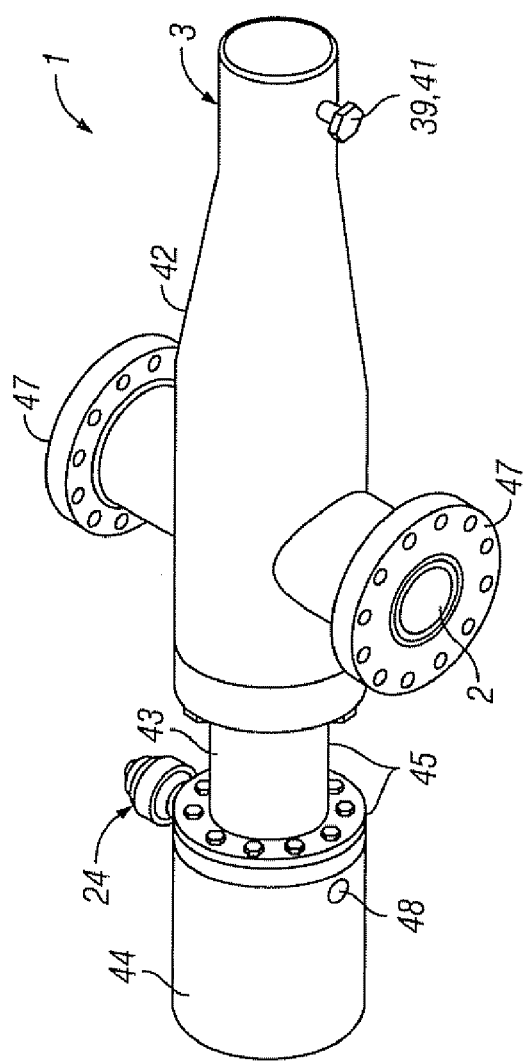

| | | |
|---|---|---|
| 4,815,295 A | 3/1989 | Narum |
| 4,827,963 A * | 5/1989 | Baker et al. .................. 137/75 |
| 4,836,243 A * | 6/1989 | Ferrell ....................... 137/556 |
| 5,820,162 A * | 10/1998 | Fink .......................... 280/742 |
| 6,131,594 A * | 10/2000 | Staggs et al. ................. 137/1 |
| 2003/0025094 A1 * | 2/2003 | Jones et al. .................. 251/14 |

* cited by examiner

SHUT-OFF ACTUATOR WITH GAS GENERATION DEVICE

The invention refers to a shut-off device, in particular for application in the extraction of natural gas and mineral oil, with a shut-off housing exhibiting an admission channel and in which a shut-off organ is positioned relative to the admission channel for adjustment between an open and a closed setting and with an actuating device at least for adjusting the shut-off organ from the open to the closed setting.

These types of shut-off devices are used in practice especially in the extraction of natural gas and mineral oil. A suitable shut-off device can be used on the earth's surface or above sea level as well as below ground or below the surface of the sea in the section of a delivery pipeline, in particular for gas or mineral oil, whereby in this case mineral oil or natural gas flow through the admission channel of the shut-off device. To shut off the admission channel a shut-off organ is adjustably positioned within the shut-off device between an open and a closed position relative to the admission channel. The adjustment of the shut-off organ occurs through an electrical, hydraulic, pneumatic or, where applicable, manually operated actuation device. Such an actuation device normally features a part similar to a rotating spindle, and the shut-off organ can be adjusted through the rotation of the spindle relative to the shut-off housing.

A disadvantage with the shut-off devices known in practice is that they are of a very complicated construction. With hydraulic actuation, for example, appropriate connections for the hydraulic fluid and appropriate intake and outlet lines are necessary. This demands high complexity in terms of sealing and can lead to undesirable contamination of the environment if leakages occur. With electrically operated shut-off devices appropriate electrical drives must be arranged within the shut-off housing, whereby the construction is also very complicated and expensive. With a manual actuation of the shut-off device there is a further disadvantage in that such an actuation in an emergency is not possible where a fast adjustment of the shut-off organ into the closed position is required.

The object of the invention is the improvement of a shut-off device of the type mentioned above such that, especially in an emergency, fast adjustment of the shut-off organ to the closed position is possible in a constructively easy and economical manner.

The object is fulfilled in conjunction with the features in terms of claim 1 such that the actuation device exhibits a gas generation device for the production of an adjustment pressure for adjusting the shut-off organ in the direction of the closed position. The gas generation device may create the adjustment pressure in a manner similar to an explosion, so that the closed position is assumed by the shut-off organ in a very short time. This type of gas generation device can be easily accommodated on or in the shut-off housing.

It should be noted at this point that such a gas generation device can be arranged for emergency actuation of any shut-off device, even when it is actuated manually, electrically, hydraulically or pneumatically. The gas generation device can realize the fast adjustment in the direction of the closed position. In the case of an electrical, pneumatic or hydraulic actuation the gas generation device can also be used as an emergency actuation device, in particular with the failure of the other actuation system of the shut-off organ.

The shut-off organ can be formed, for example, by a valve, tap, flap or similar device. The gas generation device is arranged in each case such that the shut-off organ is adjustable from the open to the closed position. With a shut-off device in common use in natural gas and mineral oil extraction the shut-off organ may be a slide with at least one admission port. In the open position the admission port at least partially overlaps the admission channel so that fluid can pass through the admission channel of the shut-off housing.

With an embodiment which is constructively simple and economical to realize, the shut-off organ can be adjustable laterally with respect to the admission channel, in particular it can slide.

In order to obtain the most direct effect of the gas generation device on the shut-off organ in a constructively simple manner, a piston, movable in a space in the shut-off housing, can be assigned to one pressure end of the shut-off organ. The piston is subjected to the adjustment pressure generated by the gas generation device. The appropriate adjustment pressure is transferred via the piston to the shut-off organ.

The piston can, for example, be arranged with the shut-off organ such that the organ is passed through it. The piston can be fixed to the shut-off organ by bolting down or positioning on a suitable protrusion of the shut-off organ relative to it. With a simple shut-off device which can be assembled, the shut-off organ can be supported with its pressure end on an internal side of the piston and the gas generation device can be arranged on the outside of the piston. In the simplest case the support can be realized in that the pressure end stands on the internal side of the piston. It is also possible that the pressure end is fixed in a releasable manner on the internal side of the piston or also the piston is formed as one part with the shut-off organ. The gas generation device here is assigned to the opposite external side of the piston which is subject to pressure during the explosive production of the gas.

A simply constructed and easily obtainable gas generation device is, for example, a gas generator such as is used in airbags or similar. This can be triggered electronically for the production of the gas. The pressure produced by such a gas generator and in particular the explosive generation of the pressure can be used very well for the quick and reliable adjustment of the shut-off organ in the direction of the closed position.

In a simple embodiment, the gas generation device can be arranged within the shut-off housing, in particular within the pressure space. With a gas generator as gas generation device the gas generation device can be fitted as a disc-shaped device in a simple manner to an internal surface of the shut-off housing assigned to the external surface of the piston.

In order to be able to maintain the gas generation device or to exchange it after use, an end of the pressure space assigned to the gas generation device can be closed off by a sealing cover. In this connection there is also the possibility that the gas generation device is arranged on the internal side of the sealing cover. Consequently, it can be removed together with the sealing cover. A used gas generation device can be replaced by fitting a new device on the sealing cover or by exchanging the sealing cover for a new gas generation device. There is also the possibility that the gas generation device is fixed in a releasable manner directly on the external side of the piston. Finally, there is also the possibility that the gas generation device is held in the pressure space between the piston and the sealing cover.

In order to press the piston and the shut-off organ, which is, where applicable, attached to it, in the direction of the opening position, a spring element can be arranged between the piston and an end-stop element within the shut-off housing.

In order to hold and guide the spring element in a simple manner without additional devices, for example, next to the shut-off organ, it can be plugged onto the shut-off organ.

For sealing the pressure space in relation to the admission channel, the end-stop element can be a first packing box through which the shut-off organ is passed through in a sealed manner.

In order to improve the sealing in the region of the packing box, a set of seals can be arranged between the first packing box and a mainly ring-shaped seating shoulder extending around the shut-off organ. The set of seals can be formed in a well-known manner by a range of metal and polymer seals.

If the piston is moved by the pressure built up by the gas generation device, then the gas contained in the pressure space between the piston and the end-stop element is compressed. In order to provide the compressed gas with a bypass possibility, a pressure equalization device can be assigned to the pressure space between the piston and the end-stop element. Such a pressure equalization device may be, for example, a comparator.

In order to be able to introduce, where applicable, an electrical cable, hydraulic fluid or similar into the pressure space, the shut-off housing in the region of the pressure space may feature a sealable wall hole. The sealing may be provided by glands screwed in or attached to the wall hole in some other manner.

In order to prevent fluid, in particular mineral oil or natural gas, from penetrating from the admission channel along the shut-off organ into the remaining shut-off housing, sealing rings, in particular in metal, can be arranged between the shut-off organ and the admission channel on both sides. The sealing rings are arranged with their admission ports substantially flush to the free opening of the admission channel and are also preferentially flush to the admission port in the shut-off organ in its open position.

In order to further improve the sealing between the shut-off organ and shut-off housing, a second packing box can be pushed on the shut-off organ for holding another set of seals between the admission channel and the latching end opposite the pressure end of the shut-off organ. In this case the packing box may feature an external thread for screwing with a corresponding internal thread in the shut-off housing.

In order to hold the shut-off organ largely automatically in the closed position, the latching end may feature a substantially cylindrical free end section and a somewhat conical wedge section connected to it. The wedge section is assigned to a conical hole section of a longitudinal hole of the shut-off housing at least in the closed position of the shut-off organ, whereby a cone angle of the hole section is formed identical to the cone angle of the wedge section. The cylindrical free end section provides the longitudinal guidance of the shut-off organ in a corresponding cylindrical section of the longitudinal hole. When the shut-off organ is moved into the closed position, the conical wedge section is pushed into the conical hole section or at least pushed further into it until the corresponding conical sections come together and are wedged together. The wedging occurs in this connection such that automatic resetting does not occur, for example, due to the compressed spring element or fall in the gas pressure in the pressure space.

In order in this connection not to have to replace the shut-off device with a new shut-off device, a release device for resetting from the closed position into the open position can be assigned to the shut-off organ.

With a simple embodiment of the release device it may feature a release element movable in the direction of the free end section within the longitudinal hole. This is pressed against the end section, whereby the wedging of the wedge section and corresponding hole section is released and then the shut-off organ is moved back into the open position, in particular, by the resetting force of the spring element.

A constructively simple release element and one which is easy to move may be a release ball.

In order to move the release element, a corresponding pressure can be applied to the release element in the direction of the shut-off organ. The applied pressure can occur through an appropriate pressure fluid. A simple mechanical solution will be appreciated here in that the release element is movable, in particular, through a release element, supported for movement transverse to the longitudinal hole and substantially pin-shaped.

In order to move the release element in the direction of the shut-off organ, for example, by rotating the trigger element, the trigger element can be formed as a setting screw provided with a conical section.

In order to be able to both replace the gas generation device externally and also to be able to actuate the setting screw externally, the setting screw and sealing cover can be accessible from outside the shut-off housing. With application of the shut-off device below the surface of the sea, a remotely controlled diving robot or a remotely controlled submarine can be used with appropriate actuating equipment in order to release the sealing cover, replace the gas generation device or to actuate the release device for resetting the shut-off organ in the open position.

In order to be able to adapt the shut-off device in a simple manner to different circumstances, the shut-off housing can be composed of a number of housing modules attached to one another in a manner such that they can be released. The modules, for example, can be selected and attached together for variation of the size of the free space, to realize different admission channels, for the application of different shut-off organs or similar.

In connection with the spring element an advantage can arise if it is prestressed between the sealing cover and end-stop element. Consequently, separate mounting of the first packing box, which is in particular formed as an end-stop element, within the shut-off housing is not necessary. Instead the packing box is pressed against the set of seals by the prestressed spring element and ensures adequate sealing.

In the following an advantageous embodiment of the invention is explained in further detail based on the figures shown in the drawing.

The following are illustrated:

FIG. 1 A perspective plan from diagonally above on an embodiment of the shut-off device according to the invention.

Figure 2:
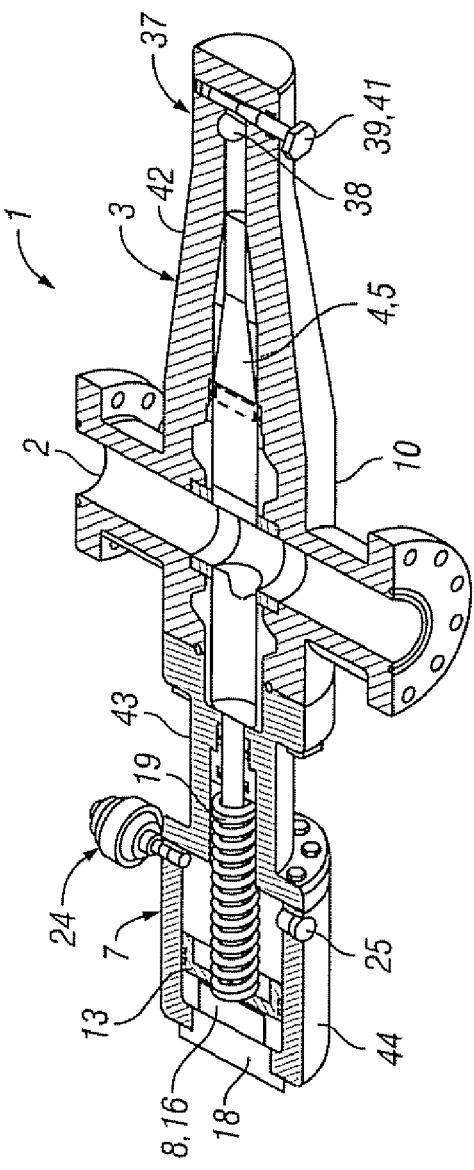

FIG. 2 A perspective plan of a shut-off device according to FIG. 1 illustrated in a longitudinal section.

Figure 3:
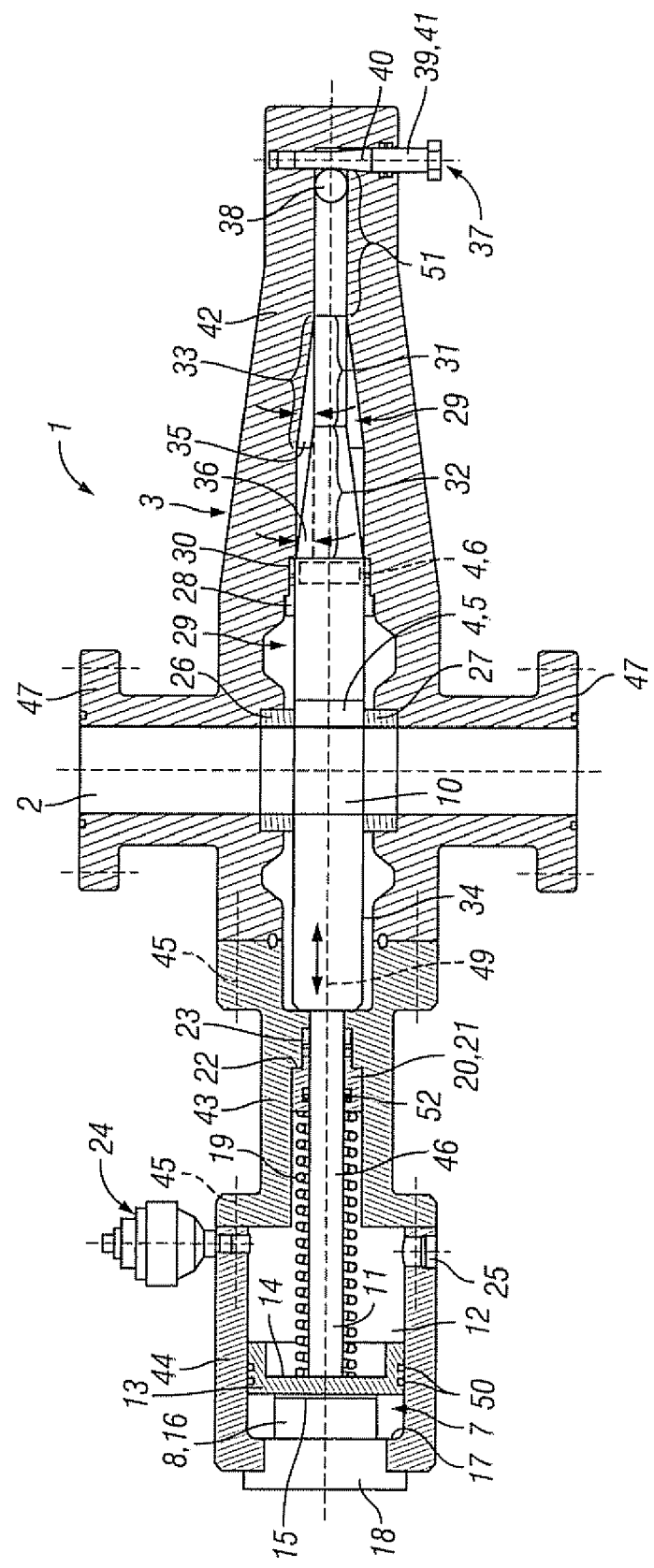

FIG. 3 A longitudinal section through the shut-off device according to FIG. 1.

In FIG. 1 the perspective plan is shown from diagonally above onto an embodiment of a shut-off device 1 according to the invention. This features a shut-off housing 3 consisting of three housing modules 42, 43 and 44. The various housing modules are attached to one another with threaded bolts 45 so that they can be released. In the housing module 42 an admission channel 2 is formed which extends laterally to the longitudinal direction of the shut-off device 1. At the ends of the admission channel 2 ring flanges 47 are formed, with which the shut-off device 1 is mounted in a releasable manner in a pipeline for natural gas or mineral oil such that the appropriate fluid is passed through the admission channel 2 in the delivery direction.

To the side on the housing module 44 a pressure equalization device 24 protrudes radially outwards. Opposite to this in the housing module 44, a plug 48 is arranged which closes off a corresponding wall hole 25 in a releasable manner, see FIGS. 2 and 3.

At the free end of the housing module 42 a setting screw 41 is arranged as release element 39 of a release device 37 which is described together with the following figures in more detail.

In FIG. 2 a longitudinal section through the shut-off device 1 according to FIG. 1 is illustrated in a perspective plan from diagonally above. Within the shut-off housing 3 a slide 9 is supported, so it can slide, as the shut-off organ 4 in the longitudinal direction 49, see FIG. 3, of the shut-off device 1. The shut-off organ 4 is arranged in a longitudinal hole 34 of the shut-off housing 3. The shut-off organ 4 features a central section with an admission port 10 which is arranged flush to the admission channel 2 in the open position 5 shown in FIG. 2. At this central section there is a cylindrical slide-rod 46 in the direction of the housing module 44 and a latching end 29 in the direction of the housing module 42. A spiral spring is pushed onto the cylindrical slide-rod 46 as the spring element 19. This extends between a piston 13, see also FIG. 3, and a packing box as end-stop element 20.

The housing module 44 features a free space 12 inside in which the piston 13, spring element 19, slide-rod 46 and also a gas generator 16 as gas generating device 8 are arranged.

The release device 37 is arranged at the free end of the housing module 42. The release device features a release ball 38 as release element and a setting screw 41 as trigger element 39. By rotating the setting screw 41 the release ball 38 can be moved in the longitudinal direction 49 of the shut-off housing 3 and in particular of the longitudinal hole 34 in the direction of slide 9.

In FIG. 3 a longitudinal section is shown through the shut-off device 1, which corresponds to the perspective plan according to FIG. 2. In this figure, as in the previous figures, the same parts are given the same reference symbols and are in part only described in further detail in conjunction with a figure.

The piston 13 is formed largely dish-shaped, whereby on its inner side 14 assigned to the admission channel a pressure end 11 of the slide rod 46 is attached. Along the circumference of the piston 13 two sealing rings 50 are arranged which subdivide through sealing the pressure space 12 into a part assigned to the gas generator 16 and a part assigned to the pressure equalization device 24. The gas generator 16 is assigned to an external side 15 of the piston 13 and arranged at an end 17 of the pressure space 12. At this end 17 the housing module 44 features an opening which is closed off by a sealing cover 18 which is applied so that it can be released. The gas generator 16 can be attached to the sealing cover 18 in a manner so that it can be released.

The gas generator 16 and piston 13 form an actuating device 7 for the adjustment of the shut-off organ 4 from the open position 5 into the closed position 6 of the shut-off organ 3 which is illustrated partly and using dashes.

The slide rod 46 extends from the pressure end 11 through to the central section of the slide 9 in which the admission port 10 is formed. At this central section there is the adjacent latching end 29. This is composed of a cylindrical end section 31 and a wedging section 32 with external cone. A cone angle 36 is assigned to the conically shaped wedging section 32. In the open position 5 the wedging section 32 is largely arranged in a cylindrical section of the longitudinal hole 34 and the end section 31 is arranged correspondingly in a hole section 33 with internal cone, whereby it is already partially engaged with its free end in a cylindrical section 51 of the longitudinal hole 34. This cylindrical section 51 extends through to the release device 37. An appropriate cone angle 35, which is equal to the cone angle 36 of the wedging section 33, is assigned to the hole section 33 with internal cone.

The spring element 19 extends from the internal side 14 of the piston 13 through to an end-stop element 20. In the illustrated embodiment this is formed as a separate part through a first packing box 21. There is also the possibility that the end-stop element is directly formed by a seating shoulder within the longitudinal hole 34.

The first packing box 21 butts against a seating shoulder with its side pointing away from the spring element 19, whereby a first set of seals 23 in preferably metal and polymer seals is arranged between the first packing box 21 and another seating shoulder 22. The first set of seals 23 is compressed by the applied pressure on the first packing box 21 by the spring element 19.

A second sealing element 52 is arranged within the first packing box 21 for sealing the slide rod 46 which passes through the stuffing box.

To the side of the pressure space 12 on one side of the housing module 44, a comparator is arranged as a pressure equalization device 24 and a wall hole 25 formed opposite it, whereby the wall hole 25 is closed off in a releasable manner by the plug 48, see FIG. 1.

In the region of the admission port 10 of the slide 9 sealing rings 26 and 27 are arranged on both sides of the slide which largely seal admission channel 2 against the longitudinal hole 34. The sealing rings 26, 27 are arranged flush to the admission channel 2 and to the admission port 10 in the open position 5 so that they do not form any protrusions which may cause eddies in the fluid flowing past.

A second packing box 28 is pushed onto the slide 9 and pushed on within the longitudinal hole 34 for holding a further set of seals 30.

If the slide 9 is pushed onto the external side 15 of the piston 13 into the closed position 6 due to triggering of the gas generator 16 and the exertion of pressure by the produced gas, then the admission port 10 is similarly so far adjusted relative to the admission channel 2 that it is closed off due to the central section of the slide 9. In order, where applicable, to move the slide 9 into the open position 5 again, the release device 37 on the free end of the housing module 42 can be employed. By screwing in the setting screw 41 as trigger element 39 its conical section 40 comes into contact with the release ball 38 and presses the release ball 38 in the direction of the admission channel 2 through the external cone of this section 40. As a result, the end section 31 is subject to force on its free end and a wedging between the wedging section 32 and the hole section 33 is released. The spring element 19 supports resetting of the slide 9 into the open position 5. In connection with the spring element 19 it must be noted that it is already under prestressing in the open position 5, see FIG. 3, in order to press the first packing box 21 in the direction of the seating shoulder 22 and correspondingly in the direction of the set of seals 23.

In the following the functioning principle of the shut-off device according to the invention is explained, in particular in conjunction with FIG. 3.

If the admission channel 2, for example, is to be closed off in an emergency during a leakage or similar situation along the pipeline for natural gas or mineral oil, the gas generator 16 is electronically triggered as the gas generation device 8. Consequently, similar to an explosion, it produces gas which exerts a corresponding pressure on the external side 15 of the piston 13. The piston 13 is as a result pushed in the free space 12 in the direction of the admission channel 12 and similarly pushes the slide rod 46 and, consequently, the slide 9 in the direction of the release device 37. The displacement occurs until the wedge section 32 and conical hole section 33 have wedged together and the slide 9 is held in the closed position 6. The admission channel 2 is closed off in this position by the slide 9.

In order to put the shut-off device 1 according to the invention into its starting state again and to prepare it for further use, the gas generator 16 is replaced by a new gas generator by releasing the sealing cover 18. In addition, the wedging between the conical hole section 33 and the conical wedging section 32 is released using the release device 37. This occurs by screwing in the setting screw 41. When it is screwed in, the release ball 38 is pressed in the direction of the admission channel 2 by the cone section 40 of the setting screw and correspondingly, causes a displacement of the cylindrical end section 31 in this direction. The spring element 19 supports the return of the slide 9 into the open position 5. The replacement of the gas generator 16 and the adjustment of the setting screw 41 occurs preferentially using a remotely controlled diving robot or a remotely controlled submarine.

The invention claimed is:

1. A shut-off device comprising:
    a shut-off housing comprising:
        an admission channel;
        a free space; and
        a hole section;
    a shut-off organ supported within said shut-off housing in an adjustable manner relative to the admission channel between an open position and a closed position, the shut-off organ comprising:
        a pressure end extending into the free space; and
        a latching end opposite the pressure end, the latching end comprising a wedging section;
    an actuating device at least for adjusting the shut-off organ from the open position into the closed position, the actuating device comprising a gas generation device capable of producing an adjustment pressure to adjust the shut-off organ in the direction of the closed position, wherein the gas generation device is arranged within the shut-off housing free space; and
    wherein the shut-off organ latching end engages and is at least partially held in place by the shut-off housing hole section when the shut-off organ is in the closed position.

2. The shut-off device according to claim 1 wherein the shut-off organ is a slide with at least one admission port.

3. The shut-off device according to claim 1 wherein the shut-off organ is adjustable and is able to slide laterally with respect to the admission channel.

4. The shut-off device according to claim 1 further comprising a piston movable in the free space of the shut-off housing and operably associated with the pressure end of the shut-off organ, the piston being subjected to the adjustment pressure produced by the gas generation device.

5. The shut-off device according to claim 4 wherein the shut-off organ is supported with its pressure end on an internal side of the piston and the gas generation device is associated with an external side of the piston.

6. The shut-off device according to claim 4 further comprising sealing rings arranged on both sides between the shut-off organ and the admission channel.

7. The shut-off device according to claim 6 wherein a second packing box is pushed onto the shut-off organ between the admission channel and the latching end opposite the pressure end of the shut-off organ for holding a further set of seals.

8. The shut-off device according to claim 7,
    wherein the shut-off organ latching end comprises a substantially cylindrical free end section and wherein the wedging section is substantially conical and is adjacent to the free end;
    wherein hole section is substantially conical; and
    wherein the cone angle of the hole section is substantially equal to the cone angle of the wedging section.

9. The shut-off device according to claim 8 further including a release device for resetting the shut-off organ from the closed position to the open position.

10. The shut-off device according to claim 8 wherein the release device includes a release element movable in the direction of the free end section within the longitudinal hole.

11. The shut-off device according to claim 10 wherein the release element is a release ball.

12. The shut-off device according to claim 10 wherein the release element is movable through a substantially pin-shaped trigger element, and is moveable laterally to the longitudinal hole.

13. The shut-off device according to claim 12 wherein the trigger element is formed as an adjustment screw provided with a conical section.

14. The shut-off device according to claim 13 wherein the adjustment screw is accessible from outside the shut-off housing.

15. The shut-off device according to claim 1 wherein the gas generation device is a gas generator.

16. The shut-off device according to claim 1 further comprising a sealing cover sealing an end of the free space assigned to the gas generation device.

17. The shut-off device according to claim 16 wherein a spring element is arranged between the piston and an end-stop element within the shut-off housing.

18. The shut-off device according to claim 17 wherein the spring element is plugged onto the shut-off organ.

19. The shut-off device according to claim 17 wherein the end stop element is a first packing box through which the shut-off organ is passed in a sealed manner.

20. The shut-off device according to claim 17 wherein a pressure equalization device is disposed in the free space between the piston and the end-stop element.

21. The shut-off device according to claim 9 wherein the spring element is prestressed between the sealing cover and the end-stop element.

22. The shut-off device according to claim 1 wherein the shut-off housing comprises a sealable wall hole in the region of the free space.

23. The shut-off device according to claim 1 wherein the shut-off housing comprises more than one housing module attached to one another in a releasable manner.

* * * * *